United States Patent Office 3,032,580
Patented May 1, 1962

---

3,032,580
THIOPHOSPHONIC ACID ESTERS AND PROCESS
FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed June 28, 1960, Ser. No. 39,238
Claims priority, application Germany July 2, 1959
13 Claims. (Cl. 260—461)

The present invention relates to and has as its objects new and useful insecticidal compounds which are generally spoken thiophosphonic acid esters. Among other objects of this invention there is the preparation of these compounds. The new compounds of this invention may be represented by the following formula

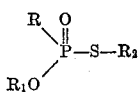

wherein R and $R_1$ preferably stand for lower alkyl radicals and $R_2$ stands for an optionally substituted phenyl radical or a cyclohexyl radical.

Corresponding phosphonic acid esters are already known e.g. from German specification 814,152. In this specification, however, the corresponding thiolphosphonic acid esters of the above formula are not described.

The new compounds of this invention can be produced according to methods known in principle i.e. by reaction of the corresponding phosphonic acid ester chlorides with correspondingly substituted mercaptans.

More specifically in the above shown formula the symbol R stands for lower alkyl radicals up to 6 carbon atoms and the radical $R_1$ stands for such lower alkyl radicals up to 4 carbon atoms. The radical $R_2$ in the above formula preferably stands for an unsubstituted phenyl radical or a phenyl radical substituted by lower alkyl groups or halogen atoms. Furthermore $R_2$ may be the cyclohexyl radical.

In comparison with the known corresponding phosphonic acid ester compounds of German specification 814,152 the new compounds are distinguished by a considerably increased insecticidal activity and improved stability. The new compounds are applied in a manner known in principle, that is in combination with suitable liquid or solid extending or diluting agents. Examples of such solid carriers are talc, chalk, bentonite, clay and the like; as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the esters of the following formulae (I)
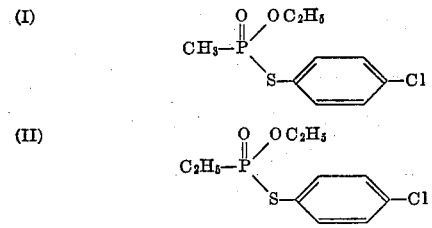

(II)

have been tested against spider mites and aphids. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredients. This premixture then is diluted with water to the desired concentration.

The tests have been carried out in the following manner.

(a) Against spider mites (contact-insecticidal action): Bean plants (*Phaseolus vulgaris*) of about 15 inches height are sprayed drip wet with solutions prepared as indicated above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | aqueous concentration (in percent active ingredient/water) | killing rate (in percent) |
|---|---|---|
| (I) | 0.01 | 100 |
| (II) | 0.001 | 100 |

(b) Against aphids of the type *Doralis fabae*: Heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | aqueous concentration (in percent active ingredient/water) | killing rate (in percent) |
|---|---|---|
| (I) | 0.01 | 100 |
| (II) | 0.001 | 100 |

The following examples are given for the purpose of illustrating the present invention:

Example 1

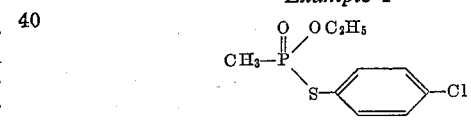

6 grams (0.25 mol) of sodium powder are slurried in 100 ml. of benzene. At 60° C. 37 grams (0.25 mol) of p-chlorophenylmercaptan, dissolved in 50 ml. of benzene are added. Stirring is continued for 2 hours at 70–80° C. The sodium has then gone into solution. 36 grams (0.25 mol) of methylphosphonic acid ethylester chloride are then added with stirring at 30° C. Stirring is continued for an hour at 30° C. The reaction product is then placed in 300 ml. of ice-water and the precipitated oil is taken up in 200 ml. of benzene. The benzene solution is washed several times with water and dried with sodium sulfate. The solvent is then evaporated in vacuum. In this manner 43 grams of the new ester are obtained as a yellow water-insoluble oil. Yield: 68% of the theoretical. Calculated for mol 251: Cl, 14.2%; P, 12.3%; S, 12.7%. Found: Cl, 13.3%; P, 12.2%; S, 13.0%.

Example 2

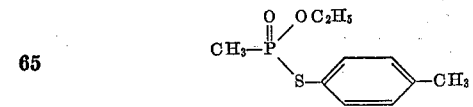

6 grams (0.25 mol) of sodium powder are slurried in 100 ml. of benzene. 32 grams (0.25 mol) of p-methylphenyl mercaptan are then added at 50–60° C. dissolved in 50 ml. of benzene. The temperature is then held for 2 hours at 60–70° C. followed by cooling to 30° C. At 30° C. 36 grams (0.25 mol) of methyl phosphonic acid ethyl ester chloride are then added with stirring. The temperature of 30° C. is held for a further hour and the reaction product then worked up as described in Example 1. 42 grams of the new ester are obtained as a weakly yellow water-insoluble oil. Yield: 73 percent of the theoretical. Calculated for mol 230: S, 13.9%; P, 13.5%. Found: S, 14.7%; P, 13.5%.

Aphids are killed completely with 0.001% solutions.

*Example 3*

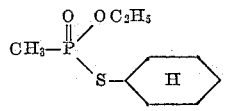

6 grams of sodium powder (0.25 mol) are slurried in 100 ml. of benzene. The temperature is held for 2 hours at 50–60° C. followed by cooling to 30° C. 36 grams (0.25 mol) of methyl phosphonic acid ethyl ester chloride are then added with stirring. The reaction product is then held for a further hour at 30° C. and then worked up in the usual way. 41 grams of the new ester of B.P. 85° C./0.01 mm. Hg are obtained. Yield: 75% of the theoretical. $LD_{50}$ on rats per os 10 mg./kg. Caterpillars are killed to the extent of 100% with 0.1% solutions.

*Example 4*

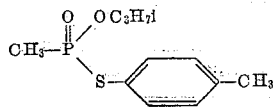

6 grams (0.25 mol) of sodium powder are slurried in 100 ml. of benzene. 32 grams (0.25 mol) of p-methylphenylmercaptan, dissolved in 50 ml. of benzene, are added with stirring at 70° C. The temperature is held for 2 hours at 70° C. followed by cooling to room temperature. Subsequently, 40 grams (0.25 mol) of methyl phosphonic acid isopropyl ester chloride are added at 40° C. The temperature is held at 40° C. for two hours and working up is continued in the usual manner. 42 grams of the new ester are obtained as a weakly yellow water-insoluble oil. Yield: 69% of the theoretical. Calculated for mol 244: S, 13.1%; P, 12.7%. Found: S, 13,6%; P, 12.8%.

$LD_{50}$ on rats per os 20 mg./kg. Aphids and spider mites are killed to the extent of 100% with 0.01% solutions.

*Example 5*

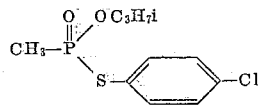

6 grams (0.25 mol) of sodium powder are slurried in 100 ml. of benzene. At 70° C. 37 grams (0.25 mol) of p-chlorophenylmercaptan, dissolved in 50 ml. of benzene, are added with stirring. Stirring is continued for two hours at 80° C. followed by cooling to 40° C. At 40° C. 40 grams (0.25 mol) of methyl phosphonic acid isopropyl ester chloride are added with stirring. The temperature is held at 40° C. for a further two hours and working up continued as usual. 41 grams of the new ester are thus obtained as a weakly yellow water-insoluble oil. Yield: 62% of the theoretical. Calculated for mol 265: Cl 13.4%; S, 12.1%; P, 11.7%. Found: Cl 13.8%; S, 12.8%; P, 11.5%.

Aphids and spider mites are killed to the extent of 100% with 0.01% solutions.

*Example 6*

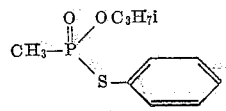

6 grams (0.25 mol) of sodium powder are slurried with 100 ml. of benzene. 28 grams (0.25 mol) of thiophenol are then added at 70° C. The temperature is held at 80° C. for two hours and 40 grams (0.25 mol) of methyl phosphonic acid isopropyl ester chloride are then added at 40° C. with stirring. The temperature is held at 40° C. for an hour followed by working up in the usual manner. 34 grams of the new ester are obtained as a yellow water-insoluble oil. Yield: 60% of the theoretical. Calculated for mol 230: S, 13.9%; P, 13.5%. Found: S, 14.2%; P, 14.0%.

Aphids are killed to the extent of 100% with 0.001% solutions.

*Example 7*

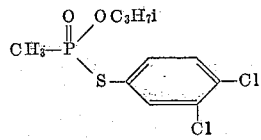

6 grams (0.25 mol) of sodium powder are slurried in 100 ml. of benzene. 49 grams (0.25 mol) of 3.4-dichlorophenylmercaptan are then added at 70° C. with stirring. Heating is continued to 80° C. for two hours followed by cooling to 40° C. 40 grams (0.25 mol) of methyl phosphonic acid isopropyl ester chloride are added at 40° C. with stirring. The temperature is held at 40° C. for an hour followed by working up in the usual way. In this manner 42 grams of the new ester are obtained as a yellow water-insoluble oil. Yield: 56% of the theoretical. Calculated for mol 299: Cl, 23.8%; S, 10.7%; P, 10.4%. Found: Cl, 24.5%; S, 11.7%; P, 9.8%.

$LD_{50}$ on rats per os 10 mg./kg. Spider mites are killed to the extent of 100% with 0.01% solutions.

*Example 8*

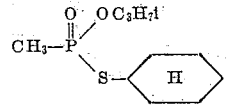

6 grams of sodium powder are slurried in 100 ml. of benzene. 29 grams (0.25 mol) of cyclohexyl mercaptan are then added with stirring and the reaction product kept for a further two hours at 50° C. 40 grams of methyl phosphonic acid isopropyl ester chloride are added at 30° C. with further stirring. Heating is continued for an hour at 40° C. and the reaction product is placed in 400 ml. of water. The precipitated oil is taken up with 300 ml. of benzene. The benzene solution is dried with sodium sulfate. By fractionation 39 grams of the new ester are obtained as a water-insoluble colorless oil of B.P. 78° C./0.01 mm. Hg. Yield: 66% of the theoretical. $LD_{50}$ on rats per os 20 mg./kg. Systemic action 100% with 0.1% solutions. Aphids are killed completely with 0.1% solutions.

*Example 9*

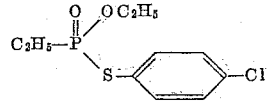

36 grams (0.25 mol) of p-chlorophenylmercaptan are dissolved in 50 ml. of anhydrous alcohol. A sodium ethylate solution is then added which contains 0.25 mol of dissolved sodium. Stirring is continued at 60° C. for an hour followed by cooling to 30° C. 40 grams of ethyl phosphonic acid-O-ethyl ester chloride (B.P. 43° C./1 mm. Hg) are added at 30° C. with good stirring. Stirring is continued for a further hour and working up as usual. In this way 43 grams of the new ester are obtained as a colorless water-insoluble oil of B.P. 118° C./0.01 mm. Hg. Yield: 65% of the theoretical. Aphids and spider mites are killed completely with 0.001% solutions. The compound shows an ovicidal action.

Example 10

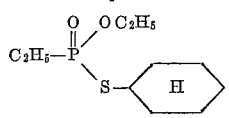

29 grams (0.25 mol) of cyclohexylmercaptan are dissolved in 50 ml. of anhydrous alcohol. A sodium ethylate solution containing 0.25 mol of dissolved sodium is added thereto. This is heated to 60° C. for an hour and then cooled to 30° C. At this temperature, 40 grams of ethyl phosphonic acid-O-ethyl-ester chloride are added dropwise. After the dropwise addition the temperature is maintained at 40° C. for an hour followed by working up in the usual way. 27 grams of the new ester are obtained of B.P. 86° C./0.01 mm. Hg. Yield: 46% of the theoretical. $LD_{50}$ on rats per os 25 mg./kg. Caterpillars are killed completely with 0.1% solutions. Spider mites are killed completely with 0.01% solutions. Systemic action 100% with 0.1% solutions.

Example 11

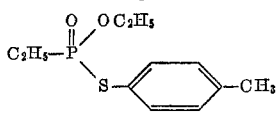

32 grams (0.25 mol) of thiocresol are dissolved in 50 ml. of anhydrous alcohol. A sodium ethylate solution containing ¼ mol of dissolved sodium is added. It is heated to 60° C. for an hour and then 40 grams of ethyl phosphonic acid-O-ethyl ester chloride are added dropwise at 30° C. The reaction product is held at 40° C. for a further hour and worked up in the usual way. 40 grams of the new ester of B.P. 112° C./0.01 mm. Hg are obtained. Yield: 67% of the theoretical.

$LD_{50}$ on rats per os 10 mg./kg. Spider mites are killed completely with 0.001% solutions. The compound shows an ovicidal action. Mosquito larvae are killed completely with 0.00001% solutions.

Example 12

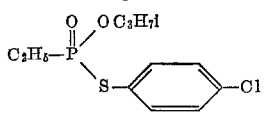

35 grams (0.25 mol) of p-chloro-thiophenyl are dissolved in 100 ml. of isopropyl alcohol. A solution of sodium methylate containing ¼ mol of dissolved sodium is added. 43 grams of ethyl phosphonic acid-O-isopropyl ester chloride (B.P. 50° C./1 mm. Hg) are added dropwise at 20° C. Stirring is continued at room temperature for a further hour followed by working up in the usual way. 54 grams of the new ester are obtained as a water-insoluble oil. Yield: 74% of the theoretical. Calculated for mol 279: Cl, 12.7%; S, 11.5%; P, 11.1%. Found: Cl, 13.1%; S, 12.0%; P, 10.8%.

$LD_{50}$ on rats per os 25 mg./kg. Aphids are killed completely with 0.01% solutions, caterpillars with 0.1% solutions, and mosquito larvae with 0.00001% solutions.

Example 13

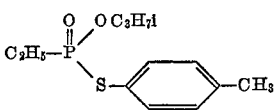

31 grams (0.25 mol) of thiocresol are dissolved in 100 ml. of isopropyl alcohol. A sodium methylate solution containing 0.25 mol of dissolved sodium is added with stirring. The mixture is heated to 60° C. for half an hour and 43 grams of ethyl phosphonic acid-O-isopropyl ester chloride are then added at 20° C. The reaction product is maintained at room temperature for an hour followed by working up in the usual manner. 51 grams of the new ester are obtained as a water-insoluble oil. Yield: 79% of the theoretical.

$LD_{50}$ on rats per os 20 mg./kg. Spider mites are killed to an extent of 70% with 0.001% solutions. Systematic action 100% with 0.1% solutions. Mosquito larvae are killed to an extent of 70% with 0.000001% solutions.

I claim:
1. A thiophosphonic acid ester of the following general formula

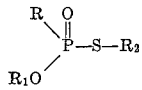

in which R stands for a lower alkyl radical up to 6 carbon atoms, $R_1$ stands for a lower alkyl radical up to 4 carbon atoms and $R_2$ stands for a member selected from the group consisting of phenyl, lower alkyl-substituted phenyl, chloro-substituted phenyl and cyclohexyl.

2. The compound of the following formula

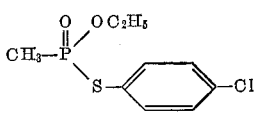

3. The compound of the following formula

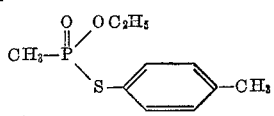

4. The compound of the following formula

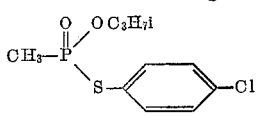

5. The compound of the following formula

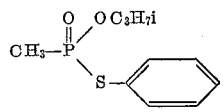

6. The compound of the following formula

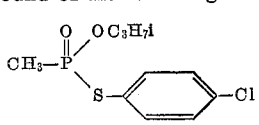

7. The compound of the following formula

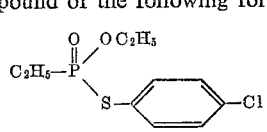

8. The compound of the following formula

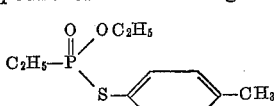

9. The compound of the following formula

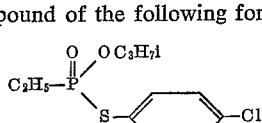

10. A compound of claim 1 wherein $R_2$ is phenyl.
11. A compound of claim 1 wherein $R_2$ is lower alkyl-substituted phenyl.
12. A compound of claim 1 wherein $R_2$ is chloro-substituted phenyl.
13. A compound of claim 1 wherein $R_2$ is cyclohexyl.

References Cited in the file of this patent
FOREIGN PATENTS 814,152    Germany _____ Sept. 20, 1951